United States Patent
Kiura et al.

(10) Patent No.: US 8,124,702 B2
(45) Date of Patent: *Feb. 28, 2012

(54) STABILIZER FOR POLYOLEFIN RESIN AND STABILIZED POLYOLEFIN RESIN COMPOSITION

(75) Inventors: Masaaki Kiura, Hiroshima (JP); Takahiro Mukuda, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 12/515,972

(22) PCT Filed: Nov. 22, 2007

(86) PCT No.: PCT/JP2007/072618
§ 371 (c)(1),
(2), (4) Date: May 22, 2009

(87) PCT Pub. No.: WO2008/062860
PCT Pub. Date: May 29, 2008

(65) Prior Publication Data
US 2010/0056675 A1    Mar. 4, 2010

(30) Foreign Application Priority Data
Nov. 24, 2006 (JP) .................. 2006-317067

(51) Int. Cl.
C08F 8/00 (2006.01)
C08F 26/06 (2006.01)
C08F 126/06 (2006.01)
C08F 216/06 (2006.01)
C08L 23/00 (2006.01)
C08L 25/02 (2006.01)

(52) U.S. Cl. ........ 526/258; 526/312; 526/332; 526/333; 525/191; 525/240; 525/241

(58) Field of Classification Search .................. 526/258, 526/312, 332, 333; 525/191, 240, 241
See application file for complete search history.

(56) References Cited

U.S. PATENT DOCUMENTS
6,583,245 B1 * 6/2003 Steinmann et al. ........ 526/218.1
2009/0105419 A1   4/2009 Mukuda et al.

FOREIGN PATENT DOCUMENTS
| JP | 54 21489 | 2/1979 |
| JP | 10 338777 | 12/1998 |
| JP | 2001 106864 | 4/2001 |
| JP | 2002 533548 | 10/2002 |
| JP | 2003 40937 | 2/2003 |
| WO | WO 2006/126680 | 11/2006 |

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

A stabilizer containing a copolymer (A) obtained by polymerizing an unsaturated monomer mixture including 1 to 50 parts by mass of ethylenically unsaturated monomer (a) (formula (I)) having a piperidyl group in a molecule, 50 to 99 parts by mass of at least one monomer (b) (isobutyl methacrylate, an alkyl (meth)acrylate having an alkyl group with 6 to 13 carbon atoms, or an aromatic vinyl monomer), and 0 to 20 parts by mass of ethylenically unsaturated monomer (c) other than the monomers (a) and (b), where the total of the monomers (a), (b), and (c) is 100 parts by mass:

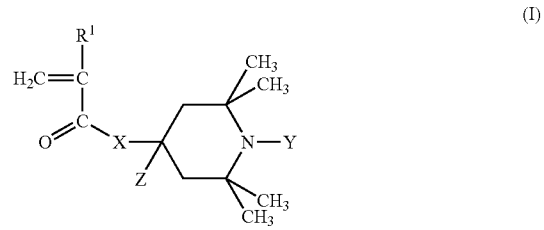

(I)

wherein $R^1$ represents H or an alkyl group having 1 to 2 carbon atoms, X represents an oxygen atom or an imino group, Y represents H or an alkyl or alkoxyl group each having 1 to 20 carbon atoms, and Z represents H or a cyano group.

7 Claims, No Drawings

STABILIZER FOR POLYOLEFIN RESIN AND STABILIZED POLYOLEFIN RESIN COMPOSITION

TECHNICAL FIELD

The present invention relates to a stabilizer for a thermoplastic resin and a stabilized resin composition. More specifically, the present invention relates to a stabilizer for a polyolefin resin which is mainly used for modification of a polyolefin resin, including for example a polypropylene resin. The stabilizer of the present invention remarkably improves thermal stability of the resin when added to the resin. The present invention further relates to a thus stabilized resin composition.

BACKGROUND ART

In recent years, enormous amount of plastic goods have been used such as those made of polyethylene, polypropylene, polystyrene, a polyester resin, an acrylic resin, and a polyvinyl chloride resin. The treatment of waste from these plastic goods has been highlighted as a growing environmental problem and has become a big social problem. Above all, a polypropylene resin is a material that is produced in the largest amount among all plastic materials, being used. For example, polypropylene resin used in bumpers of automobiles attributed to its light weight and stiffness. As a result the amount of polypropylene resin produced has been increased year by year. Consequently, polypropylene resin is one of the materials to which demand for recycling is the highest among various plastic materials. However, the polypropylene resin is essentially unstable against heat or light and is situated as a material having bad weather resistance. Therefore, investigation for antioxidants and hindered amine light stabilizers (HALS) which can improve light stability and thermal stability has been carried out for a long time.

For example, in Patent Document 1, there is proposed a technology in which a high molecular weight HALS is used to improve thermal stability in order to suppress lowering of performance due to bleed out of HALS from a substrate, which has been a conventional problem. In addition, in Patent Document 2, there is a description such that a polymer obtained by carrying out solution polymerization with a high concentration of a reactive HALS having both an unsaturated double bond and a light stabilizing function in a molecule is used as a stabilizer. Both of these technologies were insufficient judging from the performance directed to stability requirements which were becoming more sophisticated, though they could prevent the bleed out from a substrate resin, because they have a hindered amine group having a high polarity and hence could not realize sufficient dispersion performance of the HALS in the polypropylene resin which is a non-polar polymer.

Patent Document 1: Japanese Patent Application Laid-Open No. Hei 10-338,777
Patent Document 2: Japanese Patent Application Laid-Open No. 2003-40,937

DISCLOSURE OF THE INVENTION

Problem to be Solved by the Invention

The present invention has been made in view of the above-mentioned circumstances, and it is a subject of the present invention to provide a stabilizer for a polyolefin resin (hereinafter, referred to as a stabilizer) capable of giving a high degree of light stability and thermal stability to a polypropylene resin (hereinafter, referred to as a PP resin) and to provide a PP resin composition to which the stabilizer is added having a high degree of stability.

Means for Solving the Problem

The present inventors have diligently researched with the intention of solving the above-mentioned subject and found that a stabilizer that contains a copolymer obtained by polymerizing a monomer mixture obtained by mixing monomers, each having a specific structure, within a specific range of ratios, can remarkably improve stability of a PP resin when the stabilizer is added to the PP resin in a fixed amount. Based on this finding, they have completed the invention.

More specifically, the stabilizer of the present invention is the one containing a copolymer (A) which is obtained by polymerizing an unsaturated monomer mixture composed of 1 to 50 parts by mass of an ethylenically unsaturated monomer (a) represented by the following general formula (I) and having a piperidyl group in a molecule, 50 to 99 parts by mass of at least one monomer (b) selected from isobutyl methacrylate, an alkyl (meth)acrylate having an alkyl group with 6 to 13 carbon atoms, and an aromatic vinyl monomer, and 0 to 20 parts by mass of an ethylenically unsaturated monomer (c) other than the monomers (a) and (b), with the proviso that the total of the monomers (a), (b), and (c) is 100 parts by mass.

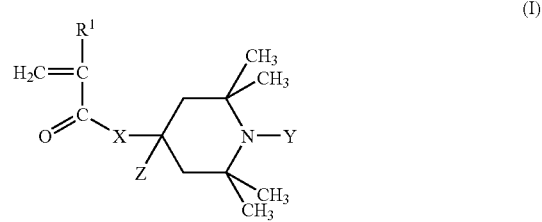

(I)

In the formula (I), $R^1$ represents a hydrogen atom or an alkyl group having 1 to 2 carbon atoms, X represents an oxygen atom or an imino group, Y represents a hydrogen atom or an alkyl or alkoxyl group each having 1 to 20 carbon atoms, and Z represents a hydrogen atom or a cyano group.

EFFECT OF THE INVENTION

According to the present invention, a stabilizer for a PP resin that can remarkably improve stability of the PP resin and a PP resin having a high stability can be provided.

BEST MODE FOR CARRYING OUT THE INVENTION

The stabilizer of the present invention is a resin composition containing a copolymer (A) which is obtained by polymerizing an unsaturated monomer mixture composed of 1 to 50 parts by mass of an ethylenically unsaturated monomer (a) represented by the above-mentioned general formula (I) and having a piperidyl group in a molecule, 50 to 99 parts by mass of at least one monomer (b) selected from isobutyl methacrylate, an alkyl (meth)acrylate having an alkyl group with 6 to 13 carbon atoms, and an aromatic vinyl monomer, and 0 to 20 parts by mass of an ethylenically unsaturated monomer (c) other than the monomers (a) and (b), with the proviso that the total of the monomers (a), (b), and (c) is 100 parts by mass.

As for the stabilizer of the present invention, it is necessary that the content of the unsaturated monomer (a) represented by the general formula (I) be 1 to 50 parts by mass, provided that the total amount of the monomers (hereinafter, being the same as the total of the monomers (a), (b), and (c)) at the time of polymerization is 100 parts by mass, from the viewpoint of competence for improving stability of the PP resin to which the stabilizer is added. When the content of the monomer (a) is 1 part by mass or more, sufficient stability can be given by the range of the amount of addition of the stabilizer, by which amount none of the characteristic of the resin to which the stabilizer is added is sharply lowered. In addition, when the content of the monomer (a) is less than 50 parts by mass, compatibility with the resin to which the stabilizer is added can be secured and sufficient stability can be given to the resin. The content of the monomer (a) is preferably 6 to 50 parts by mass, more preferably 10 to 50 parts by mass, and most preferably 10 to 40 parts by mass.

As the monomer (a), one having a radical scavenging function can be used, and, for example, 4-(meth)acryloyloxy-2,2,6,6-tetramethylpiperidine, 4-(meth)acryloylamino-2,2,6,6-tetramethylpiperidine, 4-(meth)acryloyloxy-1,2,2,6,6-pentamethylpiperidine, 4-(meth)acryloylamino-1,2,2,6,6-pentamethylpiperidine, or 4-cyano-4-(meth)acryloyloxy-2,2,6,6-tetramethylpiperidine can be mentioned. These monomers can be used alone or in a combination of two or more kinds, if necessary.

In addition, as for the stabilizer of the present invention, it is necessary that at least one monomer (b) selected from isobutyl methacrylate, an alkyl (meth)acrylate having an alkyl group with 6 to 13 carbon atoms, and an aromatic vinyl monomer be selected as a component for copolymerization with the monomer (a) and that the content of the monomer (b) be set in the range of 50 to 99 parts by mass, provided that the total amount of the monomers at the time of polymerization is 100 parts by mass, from the viewpoint of competence for improving stability of the PP resin to which the stabilizer is added. When at least one monomer is selected from the above-mentioned monomers as the monomer (b) and the content of the monomer (b) in the copolymer (A) is set to 50 parts by mass or more, compatibility with the PP resin can be secured and sufficient competence for improving stability can be given. When the amount of the monomer (b) exceeds 99 parts by mass, the amount of the monomer (a) is relatively decreased and this is not preferable. The content of the monomer (b) is preferably 50 to 94 parts by mass, more preferably 50 to 90 parts by mass, and most preferably 60 to 90 parts by mass.

As the monomer (b), for example, alkyl (meth)acrylates such as isobutyl (meth)acrylate, normal hexyl (meth)acrylate, normal octyl (meth)acrylate, 2-ethylhexyl (meth)acrylate, cyclohexyl (meth)acrylate, benzyl (meth)acrylate, phenyl (meth)acrylate, nonyl (meth)acrylate, decyl (meth)acrylate, dodecyl (meth)acrylate, lauryl (meth)acrylate, p-tertiary-butylcyclohexyl (meth)acrylate, and isobornyl (meth)acrylate; and aromatic vinyl monomers such as styrene, α-methyl styrene, vinyl toluene, and p-chlorostyrene can be mentioned. Among these monomers, (meth)acrylates having a branched alkyl group are preferable from the viewpoint of compatibility with the PP resin, and a monomer selected from isobutyl methacrylate, 2-ethylhexyl acrylate, and p-tertiary-butylcyclohexyl acrylate is particularly preferable.

The above-mentioned monomer (b) can be used alone or in a combination of two or more kinds.

As for the copolymer (A) which composes the stabilizer of the present invention, the monomer (c) other than the monomers (a) and (b) may be used as a component for copolymerization, if necessary. However, it is necessary that the content of the monomer (c) be 20 parts by mass or less, provided that the total amount of the monomers at the time of polymerization is 100 parts by mass. When the content of the monomer (c) is 20 parts by mass or less, there is only a slight decrease in compatibility with the PP resin which affects competence for improving stability of the PP resin. The content of the monomer (c) is preferably 15 parts by mass or less and particularly preferably substantially nil.

As the monomer (c), for example, methyl (meth)acrylate, ethyl (meth)acrylate, normal propyl (meth)acrylate, isopropyl (meth)acrylate, methyl (eth)acrylate, ethyl (eth)acrylate, normal butyl (meth)acrylate, tertiary butyl (meth)acrylate, (meth)acrylonitrile, 2-hydroxyethyl (meth)acrylate, 2-(3-)hydroxypropyl (meth)acrylate, 4-hydroxybutyl (meth)acrylate, glycerol mono(meth)acrylate, glycidyl (meth)acrylate, (meth)acrylamide, N,N-dimethylaminoethyl (meth)acrylate, vinyl pyridine, vinyl alcohol, vinyl imidazole, vinyl pyrrolidone, vinyl chloride, vinylidene chloride, vinyl fluoride, vinylidene fluoride, tetrafluoroethylene, hexafluoropropylene, vinyl acetate, vinyl ether, (meth)acrylic acid, crotonic acid, itaconic acid, monomethyl itaconate, monoethyl itaconate, monopropyl itaconate, monobutyl itaconate, dimethyl itaconate, diethyl itaconate, dipropyl itaconate, dibutyl itaconate, fumaric acid, monomethyl fumarate, monoethyl fumarate, monopropyl fumarate, monobutyl fumarate, dimethyl fumarate, diethyl fumarate, dipropyl fumarate, dibutyl fumarate, maleic acid, monomethyl maleate, monoethyl maleate, monopropyl maleate, monobutyl maleate, dimethyl maleate, diethyl maleate, dipropyl maleate, dibutyl maleate, ethylene, and propylene can be mentioned. The above-mentioned monomer (c) can be used alone or in a combination of two or more kinds.

As for a method of polymerization to obtain the copolymer (A) which composes the stabilizer of the present invention, it is not particularly limited, and publicly known polymerization methods such as emulsion polymerization method, suspension polymerization method, solution polymerization method, and bulk polymerization method can be used, however, it is preferably a polymerization method that uses water as a medium such as emulsion polymerization method or suspension polymerization method from the viewpoints of easiness of recovery of the copolymer (A), low odor of polymerized substances, handling properties, blocking resistance, and economy. When polymerization is carried out using a polymerization method that can provide a particle structure such as emulsion polymerization method, soap-free emulsion polymerization method, or dropping suspension polymerization method, the particle structure may be either a single layer structure or a multilayer structure. However, in the case of the multilayer-structure particle, a structure having not more than three layers is preferable from the viewpoint of economy. As an emulsifier to be used at the time of polymerization to obtain the copolymer (A) which composes the stabilizer of the present invention by emulsion polymerization, various conventionally known anionic or nonionic emulsifiers, polymer emulsifiers, and reactive emulsifiers having a radical-polymerizable unsaturated double bond in a molecule can be mentioned. As the emulsifiers, anionic emulsifiers such as trade names "Newcol 560SF", "Newcol 562SF", "Newcol 707SF", "Newcol 707SN", "Newcol 714SF", "Newcol 723SF", "Newcol 740SF", "Newcol 2308SF", "Newcol 2320SN", "Newcol 1305SN", "Newcol 271A", "Newcol 271 NH", "Newcol 210", "Newcol 220", "Newcol RA331", and "Newcol RA332", which are manufactured by Nippon Nyukazai Co., Ltd.; trade names "LATEMUL B-118E", "LEVENOL WZ", and "NEOPELEX G15", which are manufactured by Kao Corporation; and trade name "Hitenol N08", which is manufactured by Dai-Ichi Kogyo Seiyaku Co., Ltd., and nonionic emulsifiers such as trade names "NONIPOL 200" and "NEWPOL PE-68", which are manufactured by Sanyo Chemical Industries, Ltd. can be mentioned.

As the polymer emulsifiers, for example, polyvinyl alcohol, polyhydroxyethyl (meth)acrylate, polyhydroxypropyl (meth)acrylate, and polyvinylpyrrolidone can be mentioned. As the reactive emulsifiers, for example, reactive anionic emulsifiers such as trade names "Antox MS-60" and "Antox MS-2N", which are manufactured by Nippon Nyukazai Co., Ltd.; trade name "ELEMINOL JS-2", which is manufactured by Sanyo Chemical Industries, Ltd.; trade names "LATEMUL S-120", "LATEMUL S-180", "LATEMUL S-180A", and "LATEMUL PD-104", which are manufactured by Kao Corporation; trade names "ADEKA REASOAP SR-10" and "ADEKA REASOAP SE-10", which are manufactured by ADEKA Corporation; and trade names "AQUARON KH-05", "AQUARON KH-10", and "AQUARON HS-10", which are manufactured by Dai-Ichi Kogyo Seiyaku Co., Ltd., and, for example, reactive nonion emulsifiers such as trade names "ADEKA REASOAP NE-10", "ADEKA REASOAP ER-10", "ADEKA REASOAP NE-20", "ADEKA REASOAP ER-20", "ADEKA REASOAP NE-30", "ADEKA REASOAP ER-30", "ADEKA REASOAP NE-40", and "ADEKA REASOAP ER-40", which are manufactured by ADEKA Corporation; and trade names "AQUARON RN-10", "AQUARON RN-20", "AQUARON RN-30", and "AQUARON RN-50", which are manufactured by Dai-Ichi Kogyo Seiyaku Co., Ltd. can be mentioned. These emulsifiers can be used alone or in a combination of two or more kinds, if necessary. In addition, reactive emulsifiers are not contained in unsaturated monomers at the time of polymerization to obtain the copolymer (A) which composes the stabilizer of the present invention.

In addition, as a solvent to be used at the time of polymerization to obtain the copolymer (A) which composes the stabilizer of the present invention by a solution polymerization method, publicly known organic solvents may be used, for example, aromatic solvents such as toluene, xylene, and other aromatic solvents; ester solvents such as ethyl acetate, butyl acetate, and cellosolve acetate; and ketone solvents such as acetone, methyl ethyl ketone, diethyl ketone, and methyl isobutyl ketone. These solvents may be used alone or in a combination of two or more kinds.

In addition, as a dispersion stabilizer to be used at the time of polymerization to obtain the copolymer (A) which composes the stabilizer of the present invention by a suspension polymerization method, for example, substantially water-insoluble inorganic compounds such as calcium phosphate, calcium carbonate, aluminium hydroxide, and precipitated silica powder; nonionic polymer compounds such as polyvinyl alcohol, polyethylene oxide, and a cellulose derivative; and anionic polymer compounds such as polyacrylic acid and salt thereof, polymethacrylic acid and salt thereof, and a copolymer of methacrylate ester with methacrylic acid or salt thereof can be used. Among them, the anionic polymer compounds are quite excellent as dispersants of the suspension polymerization because they can maintain dispersion stability with a minimal quantity. These dispersion stabilizers may be used alone or in a combination of two or more kinds.

The copolymer (A) which composes the stabilizer of the present invention thus polymerized by each of these various kinds of polymerization methods may be recovered as a solid matter by a method suitable for each polymerization method. For example, when emulsion polymerization is used to obtain the copolymer (A), a resin portion may be recovered by a spray-drying method, salting-out coagulation method, centrifugal separation method, or freeze-drying method. As the method for recovering the solid matter using the spray-drying method, an emulsified dispersed matter obtained by emulsion polymerization is spray dried by a spray dryer at an inlet temperature of 120 to 220° C. and an outlet temperature of 40 to 90° C. and powder can be recovered. The outlet temperature is preferably 40 to 80° C. from the viewpoint of easiness in shredding properties of recovered secondary particles into primary particles and is particularly preferably 40 to 70° C. In addition, as the method for recovering the solid matter using the salting-out coagulation method, the emulsified dispersions are brought into contact with a coagulant at 30 to 60° C. and coagulated while stirred to obtain a slurry, and the slurry is dewatered and dried, and powder can be recovered. As the coagulant in the salting-out coagulation method, for example, inorganic acids such as hydrochloric acid, sulfuric acid, nitric acid, and phosphoric acid; organic acids such as formic acid and acetic acid; inorganic salts such as aluminum sulfate, magnesium sulfate, and calcium sulfate; and organic salts such as calcium acetate can be mentioned. However, when coagulation by an acid such as hydrochloric acid is carried out, it is preferable to wash the obtained powder with a basic water solution such as ammonium water solution after the powder is recovered because there is a risk for deactivation of a hindered amine group with the acid. In addition, when solution polymerization is used to obtain the copolymer (A), the solid matter may be recovered by a reprecipitation method or a solvent evaporation-stripping method. When suspension polymerization is used to obtain the copolymer (A), recovery with filtration is the simplest method.

In addition, the copolymer (A) which composes the stabilizer of the present invention can be obtained by polymerization using the monomers (a), (b), and (c), and a radical polymerization initiator. As the polymerization initiator, one that is conventionally used in radical polymerization can be used. The specific examples thereof include persulfuric acid salts such as potassium persulfate, sodium persulfate, and ammonium persulfate; oil-soluble azo compounds such as azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and 2-phenylazo-4-methoxy-2,4-dimethylvaleronitrile; water-soluble azo compounds such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazoline-2-yl)propane] and its salts, 2,2'-azobis[2-(2-imidazoline-2-yl)propane] and its salts, 2,2'-azobis[2-(3,4,5,6-tetrahydropyrimidine-2-yl)propane] and its salts, 2,2'-azobis{2-[1-(2-hydroxyethyl)-2-imidazoline-2-yl]propane} and its salts, 2,2'-azobis(2-methylpropionamidine) and its salts, 2,2'-azobis(2-methylpropyne amidine) and its salts, and 2,2'-azobis[N-(2-carboxyethyl)-2-methyl propionamidine] and its salts; and organic peroxides such as benzoyl peroxide, cumene hydroperoxide, t-butyl hydroperoxide, t-butyl peroxy-2-ethylhexanoate, and t-butyl peroxyisobutyrate. These initiators can be used alone or as a mixture of two or more kinds. In addition, when emulsion polymerization is carried out to obtain the copolymer (A), it is advantageous to use a reducing agent, for example, such as sodium bisulfite, ferrous sulfate, or an ascorbate salt in a combination with a radical polymerization catalyst.

The mass average molecular weight (hereinafter, referred to as Mw) of the copolymer (A) which composes the stabilizer of the present invention is not particularly limited, however, it is preferably in the range of from 5,000 to 200,000. When Mw is 5,000 or more, a problem of elution from a coating film is not caused and competence for improving weather resistance can be realized for a long period of time. On the other hand, when Mw is 200,000 or less, a good solubility to a weak solvent can be secured. The range of Mw is more preferably from 5,000 to 100,000 and particularly preferably from 5,000 to 50,000. A method for adjusting Mw is not particularly limited, however, a method using a chain transfer agent is also an effective means in addition to a method by means of adjustment of the amount of the initiator.

As the chain transfer agent, publicly known chain transfer agents like mercaptans such as n-dodecyl mercaptan, t-dodecyl mercaptan, n-octyl mercaptan, n-tetradecyl mercaptan, n-hexyl mercaptan, and n-butyl mercaptan; halogenated compounds such as carbon tetrachloride and ethylene bromide; and α-methylstyrene dimer may be used. The amount of the chain transfer agent to be used may be changed depending on a kind of the chain transfer agent and on a constitutional ratio of the unsaturated monomers. The above-mentioned chain transfer agents can be used alone or in a combination of two or more kinds.

In addition, the glass transition temperature (Tg) of the copolymer (A) which composes the stabilizer of the present invention is not limited, however, it is preferably 50° C. or higher from the viewpoint of handling properties. In particular, when the multilayer-structure particle is formed using an emulsion polymerization method, it is preferable to form a copolymer layer having a Tg of 50° C. or more in the outermost layer. As the above-mentioned Tg, a calculated glass transition temperature obtained from Fox equation is used. The Fox equation is a relation equation of a glass transition temperature (° C.) of the copolymer with glass transition temperatures (° C.) of homopolymers each of which is independently polymerized from a constituent monomer of the copolymer.

$$1/(273+Tg)=\Sigma(W_i/(273+Tg_i))$$

In the equation, $W_i$ represents a mass fraction of monomer$_i$ and $Tg_i$ represents Tg (° C.) of a homopolymer of the monomers.

Note that, as the Tg of the homopolymer, specifically, a value described in "Polymer Handbook 3rd Edition" (A WILEY-INTERSCIENCE PUBLICATION, 1989) can be used.

For the stabilizer of the present invention, the copolymer (A) may be used alone or the copolymers (A), each having a different composition, may be used in a combination of two or more kinds. In addition, the stabilizer of the present invention may be directly compounded to a PP resin or may be previously compounded to a PP resin in a high concentration to prepare what is called a masterbatch and thus obtained masterbatch may be compounded to the PP resin.

In addition, as a PP resin composition to which the stabilizer of the present invention is added, it is preferable that a small amount of a hindered amine light stabilizer other than the stabilizer of the present invention be jointly used in order to further improve stability, in particular, light stability. The frame of a hindered amine usable as the hindered amine light stabilizer is not particularly limited, and a conventional hindered amine light stabilizer such as those of "N—H type", "N—R type", and "N—O—R type" may be used, however, the "N—O—R type" hindered amine light stabilizer is particularly preferable from the viewpoint of improvement on weather resistance of a coating film. As the "N—H type" hindered amine light stabilizer, for example, trade name "TINUVIN 770", manufactured by Ciba Japan K.K.; and trade names "ADEKASTAB LA-57", "ADEKASTAB LA-63P", and "ADEKASTAB LA-68P", which are manufactured by ADEKA Corporation can be mentioned, and as the "N—R type" hindered amine light stabilizer, for example, trade names "TINUVIN 292", "TINUVIN 144", "TINUVIN 765", and "KIMASORB 119FL", which are manufactured by Ciba Japan K.K.; and trade names "ADEKASTAB LA-52", "ADEKASTAB LA-62", and "ADEKASTAB LA-67", which are manufactured by ADEKA Corporation can be mentioned, and as the "N—O—R type" hindered amine light stabilizer, for example, trade names "TINUVIN 123", "TINUVIN 494AR", "TINUVIN NOR371FF", and "FLAMESTAB NOR116FF", which are manufactured by Ciba Japan K.K. can be mentioned. These hindered amine light stabilizers can be used alone or in a combination of two or more kinds. The amount of addition of the hindered amine light stabilizer is not particularly limited, however, it is preferably 0.01 to 1 part by mass based on 100 parts by mass of the total of the stabilizer of the present invention and the hindered amine light stabilizer. When the amount of addition of the hindered amine light stabilizer is less than 0.01 part by mass, there is a case where sufficient competence for improving stability is not realized. In addition, when the amount of addition of the hindered amine light stabilizer is 1 part by mass or less, none of the characteristic value of the PP resin is lowered. The amount of addition of the hindered amine light stabilizer is preferably 0.01 to 0.8 part by mass.

The stabilizer of the present invention can be molded together with a resin to which the stabilizer is added with various conventional molding methods such as injection molding method, extrusion molding method, blow molding method, compression molding method, calendar molding method, inflation molding method, and melt extrusion spinning method. The amount of addition of the stabilizer of the present invention is not particularly limited, however it is preferably in the range of from 0.1 to 20 parts by mass based on 100 parts by mass of the total of the stabilizer and the resin to which the stabilizer is added. When the amount of addition of the stabilizer of the present invention is less than 0.1 part by mass, there is a case where sufficient competence for improving stability is not realized. In addition, when the amount of addition of the stabilizer is 20 parts by mass or less, none of the characteristic of the resin to which the stabilizer is added is sharply lowered. In addition, in order to make the stabilizer of the present invention and the PP resin including the stabilizer realize a high degree of performance, a hindered phenol antioxidant, phosphorus antioxidant, sulfur antioxidant, ultraviolet absorbent, processing aid, lubricant, plasticizer, antifog agent, defogging agent, hydrophilicity imparting agent, inorganic heat stabilizer, antitack agent, filler, impact strength modifier, pigment, dye, flame retardant, mold release agent, preservative, antimicrobial agent, foaming agent, delustering agent, antistatic agent, heat insulating agent, and reflection agent can be jointly used, if necessary.

Among the above-mentioned additives, as the hindered phenol antioxidant, for example, trade names "YOSHINOX BHT", "YOSHINOX BB", "YOSHINOX 2246G", "YOSHINOX 425", "YOSHINOX 250", "YOSHINOX 930", "TOMINOX SS", "TOMINOX TT", "TOMINOX 917", and "TOMINOX 314", which are manufactured by API Corporation; trade names "IRGANOX 1010", "IRGANOX 1010FF", "IRGANOX 1035", "IRGANOX 1035FF", "IRGANOX 1076", "IRGANOX 1076FD", "IRGANOX 1076DWJ", "IRGANOX 1098", "IRGANOX 135", "IRGANOX 1330", "IRGANOX 1425WL", "IRGANOX 1520L", "IRGANOX 1520SE", "IRGANOX 1726", "IRGANOX 245", "IRGA- NOX 245FF", "IRGANOX 245DWJ", "IRGANOX 259", "IRGANOX 3114", "IRGANOX 3790", "IRGANOX 5057", "IRGANOX 565", and "IRGANOX 565DD", which are manufactured by Ciba Japan K.K.; and trade names "ADEKASTAB AO-20", "ADEKASTAB AO-30", "ADEKASTAB AO-40", "ADEKASTAB AO-50", "ADEKASTAB AO-50F", "ADEKASTAB AO-60", "ADEKASTAB AO-60G", "ADEKASTAB AO-70", "ADEKASTAB AO-80", "ADEKASTAB AO-330", "ADEKASTAB A-611", "ADEKASTAB A-611RG", "ADEKASTAB A-612", "ADEKASTAB A-612RG", "ADEKASTAB A-613", "ADEKASTAB A-613RG", "ADEKASTAB AO-51", "ADEKASTAB AO-15", "ADEKASTAB AO-18", "ADEKASTAB AO-328", and "ADEKASTAB AO-37", which are manufactured by ADEKA Corporation can be mentioned. These hindered phenol antioxidants can be used alone or in a combination of two or more kinds.

In addition, as the phosphorus antioxidant, for example, trade names "IRGAFOS 168", "IRGAFOS 168FF", "IRGAFOS 12", "IRGAFOS 38", "IRGAFOS P-EPQ", and "IRGAFOS P-EPQ FD", which are manufactured by Ciba Japan K.K.; and trade names "ADEKASTAB PEP-4C", "ADEKASTAB PEP-8", "ADEKASTAB PEP-8W", "ADEKASTAB PEP-24G", "ADEKASTAB PEP-36", "ADEKASTAB PEP-36Z", "ADEKASTAB HP-10", "ADEKASTAB 2112", "ADEKASTAB 2112RG", "ADEKASTAB 260", "ADEKASTAB 522A", "ADEKASTAB 1178", "ADEKASTAB 1500", "ADEKASTAB C", "ADEKASTAB 135A", "ADEKASTAB 3010", and "ADEKASTAB TPP", which are manufactured by ADEKA Corporation can be mentioned. These phosphorus antioxidants can be used alone or in a combination of two or more kinds.

In addition, as the sulfur antioxidant, for example, trade names "IRGANOX PS 800 FD" and "IRGANOX PS 802 FD", which are manufactured by Ciba Japan K.K.; and trade names "ADEKASTAB AO-412S" and "ADEKASTAB AO-503", which are manufactured by ADEKA Corporation can be mentioned. These sulfur antioxidants can be used alone or in a combination of two or more kinds.

In addition, as the ultraviolet absorbent, for example, trade names "TINUVIN P", "TINUVIN P FL", "TINUVIN 234", "TINUVIN 326", "TINUVIN 326FL", "TINUVIN 329", "TINUVIN 329FL", "TINUVIN 360", "TINUVIN 213", "TINUVIN 571", "TINUVIN 1577FF", "TINUVIN 120", "KIMASORB 81", and "KIMASORB 81 FL", which are manufactured by Ciba Japan K.K.; and trade names "ADEKASTAB LA-32", "ADEKASTAB LA-36", "ADEKASTAB LA-36RG", "ADEKASTAB LA-31", "ADEKASTAB LA-31RG", "ADEKASTAB 1413", and "ADEKASTAB LA-51", which are manufactured by ADEKA Corporation can be mentioned. These ultraviolet absorbents can be used alone or in a combination of two or more kinds.

In addition, as the processing aid, for example, trade names "METABLEN A-3000", "METABLEN P-700", "METABLEN P-551", and "METABLEN L-1000", which are manufactured by Mitsubishi Rayon Co., Ltd.; trade names "KANE ACE PA-20" and "KANE ACE PA-100", which are manufactured by Kaneka Corporation; and trade names "MARK LS-3" and "MARK LS-5", which are manufactured by ADEKA Corporation can be mentioned. These processing aids can be used alone or in a combination of two or more kinds.

In addition, as the plasticizer, for example, trade names "Plasticizer B2714", "Plasticizer P0288", "Plasticizer B2715", "Plasticizer P0279", "Plasticizer P0304", "Plasticizer P0291", "Plasticizer P0292", "Plasticizer P0293", "Plasticizer P0296", "Plasticizer P0298", "Plasticizer P0299", "Plasticizer P0300", "Plasticizer P0301", "Plasticizer P0302", "Plasticizer P0303", "Plasticizer P0305", "Plasticizer P0306", "Plasticizer P0307", "Plasticizer D3248", "Plasticizer E0164", "Plasticizer 10157", "Plasticizer P0657", "Plasticizer P1344", "Plasticizer P0468", "Plasticizer P1021", "Plasticizer P0265", "Plasticizer P1331", "Plasticizer P2069", "Plasticizer P0266", "Plasticizer P0273", "Plasticizer P0270", "Plasticizer P0271", "Plasticizer P0272", "Plasticizer P0683", "Plasticizer P0268", "Plasticizer P1022", "Plasticizer B0881", "Plasticizer A1308", "Plasticizer S0027", "Plasticizer O0054", "Plasticizer O0143", "Plasticizer F0116", "Plasticizer M0009", "Plasticizer O0055", "Plasticizer A1386", "Plasticizer A0931", "Plasticizer A1388", "Plasticizer B2716", "Plasticizer A0163", "Plasticizer A0653", "Plasticizer A1473", "Plasticizer F0117", "Plasticizer M0011", "Plasticizer S0025", "Plasticizer S0028", "Plasticizer A0655", "Plasticizer S0023", "Plasticizer A0162", "Plasticizer M0010", "Plasticizer S0024", "Plasticizer S0103", "Plasticizer A0706", "Plasticizer A0164", "Plasticizer A1387", "Plasticizer A0654", "Plasticizer A0166", "Plasticizer A1308", "Plasticizer M0027", "Plasticizer O0054", "Plasticizer O0143", "Plasticizer F0166", "Plasticizer M0009", "Plasticizer O0055", "Plasticizer D1230", "Plasticizer D1522", "Plasticizer B0828", "Plasticizer B0489", "Plasticizer B0498", "Plasticizer G0082", "Plasticizer T0364", "Plasticizer G0086", "Plasticizer T0923", "Plasticizer B0496", "Plasticizer B0737", "Plasticizer C0602", "Plasticizer C0601", "Plasticizer E0164", "Plasticizer A0086", "Plasticizer A0879", "Plasticizer C0366", "Plasticizer A0822", "Plasticizer C0367", and "Plasticizer C0368", which are manufactured by Tokyo Chemical Industry Co., Ltd. can be mentioned. These plasticizers can be used alone or in a combination of two or more kinds.

In addition, as the fire retardant, for example, trade names "ADEKASTAB PFR", "ADEKASTAB FP-600", "ADEKASTAB FP-700", "ADEKASTAB FP-2000", and "ADEKASTAB FP-2200", which are manufactured by ADEKA Corporation; trade names "REOFOS 35", "REOFOS 65", "REOFOS 95", "REOFOS 110", "REOFOS TPP", "REOFOS RDP", "REOFOS BAPP", "REOFOS CDP", "CHLONITEX TCP", "CHLONITEX TXP", "REOMOL TIBP", "REOMOL TOP", "KP-140", "REOLUBE HYD-110", "EMPARA 40", "EMPARA 70", "EMPARA K-43", "EMPARA K-45", "EMPARA K47", "EMPARA K-50", "EMPARA AR-500", "POLYSAFE 100", "POLYSAFE 100-T", "POLYSAFE 100-NDT", "POLYSAFE FCP-5", "POLYSAFE FCP-6", "POLYSAFE NS-80A", "POLYSAFE NS-80B", "POLYSAFE NH-12", and "POLYSAFE MG-23X", which are manufactured by Ajinomoto Fine-Techno Co., Inc.; and trade names "FLAMESTAB NOR 116FF", "MELAPUR MC 25", and "MELAPUR 200/70", which are manufactured by Ciba Japan K.K. can be mentioned. These flame retardants can be used alone or in a combination of two or more kinds.

In addition, as the hydrophilicity imparting agent, for example, trade name "IRGASURF HL 560", manufactured by Ciba Japan K.K. can be mentioned.

In addition, as the antistatic agent, for example, trade names "IRGASTAT P16", "IRGASTAT P18", "IRGASTAT P20", and "IRGASTAT P22", which are manufactured by Ciba Japan K.K. can be mentioned. These antistatic agents can be used alone or in a combination of two or more kinds.

In addition, as the antimicrobial agent, for example, trade names "IRGUARD B1000", "IRGUARD B5000", "IRGUARD B5120", "IRGUARD B6000", "IRGUARD B7000", "IRGUARD B7250", "IRGUARD B7620", and "IRGUARD B7920", which are manufactured by Ciba Japan K.K. can be mentioned. These antimicrobial agents can be used alone or in a combination of two or more kinds.

In addition, as the lubricant, for example, trade names "ATMER SA 1750", "ATMER SA 1753", "ATMER SA 1753FD", "ATMER SA 1756", "ATMER SA 1759", and "ATMER SA 1759FD", which are manufactured by Ciba Japan K.K. can be mentioned. These lubricants can be used alone or in a combination of two or more kinds.

EXAMPLES

Hereinafter, the present invention will be explained in more detail by examples, however, the present invention is not limited by these examples. Note that, in the following description, "part" is based on mass.

<Manufacturing of a Test Piece for a Thermal Stability Test>

To a PP resin "MA-03" (trade name, manufactured by Japan Polypropylene Corporation), each stabilizer was independently added at a proportion described in Table 1, and the resultant mixture was kneaded at a kneading temperature of 200° C., a kneading time of 5 minutes, and a revolution of 100 rpm, using LABO PRASTOMILL manufactured by Toyo Seiki Seisaku-Sho, Ltd. to obtain a resin mixture. The resin mixture thus obtained was molded into a test piece for a thermal stability test having a width of 20 mm, a length of 100 mm, and a thickness of 2 mm, at a molding temperature of 185° C., using "Mini Max Molder CS-183" (trade name, manufactured by Custom Scientific Instruments Inc.).

<Thermal Stability Test>

The test piece manufactured by the above-mentioned method was put in an exhaust type heat oven and subjected to a consecutive heat test at 120° C. for 30 days, and the rate of change of yellowness thereof (hereinafter, referred to as ΔYI value) was obtained. This value was taken as an index for thermal stability, and the test piece was evaluated using the following standard. Note that, the measurement of YI value was carried out under the conditions of a light source vision of 2 degree based on JIS-C and a calculation equation of color difference based on JIS K7103, using Macbeth CE-7000 manufactured by Sakata Inx Corporation.

1: ΔYI value is less than 5.
2: ΔYI value is 5 or more and less than 12.
3: ΔYI value is 12 or more and less than 22.
4: ΔYI value is 22 or more.

<Light Stability Test>

The test piece manufactured by the above-mentioned method was put in an evaluation apparatus, "Daipla Metalweather KU-R4-W" (trade name, manufactured by Daipla Wintes Co., Ltd.), and tested under the conditions of a test cycle of 4 hours of irradiation and 4 hours of dew formation, UV strength of 80 mW/cm$^2$, black panel temperature of 63° C. at the time of irradiation and 30° C. at the time of dew formation, and humidity of 50% RH at the time of irradiation and 96% RH at the time of dew formation. After the test was continued for 150 hours, ΔYI value was obtained and taken as an index for weather resistance, and the test piece was evaluated using the following standard. Note that, the measurement of YI value was carried out under the conditions of a light source field of 2 degree based on JIS-C and a calculation equation of color difference based on JIS K7103, using Macbeth CE-7000 manufactured by Sakata Inx Corporation.

1: ΔYI value is less than 2.
2: ΔYI value is 2 or more and less than 4.
3: ΔYI value is 4 or more and less than 6.
4: ΔYI value is 6 or more.

<Mass Average Molecular Weight (Mw)>

In Examples 1 to 7 and Comparative Examples 1 and 2, 0.1 g of a sample was taken from each copolymer (A) and put in a sample vial. To the sample vial, 10 g of tetrahydrofran (THF) was added and the resultant vial was left alone for a night at a room temperature. A measurement of a mass average molecular weight was carried out on a thus prepared solution, under the following conditions, using HLC-8120 manufactured by Tosoh Corporation, and a mass average molecular weight (Mw) in terms of a polystyrene standard was obtained.

Column: TSK gel, TSL gel; 4 columns of Super HM-M (6.0 mm in internal diameter and 15 cm in length)
Eluate: THF
Flow rate: 0.6 ml/min
Injection quantity: 20 μl
Column temperature: 40° C.
Detector: RI <Synthesis of Dispersant (a) for Suspension Polymerization>

In a separable flask having an inside volume of 3,000 ml and equipped with a condenser, 165 g of sodium 2-sulfoethyl methacrylate, 25 g of potassium methacrylate, 30 g of methyl methacrylate, and 2,250 g of deionized water were stirred under a nitrogen atmosphere and heated to 50° C., and then 0.25 g of ammonium persulfate was added as a polymerization initiator and the resultant contents were heated to 60° C. While, at the same time as the polymerization initiator was added, methyl methacrylate was continuously dropped into the flask at a rate of 0.4 g/min for 75 minutes. The resultant contents were stirred at 60° C. for 6 hours and a solution of a transparent polymerized matter having a viscosity of 1,000 Pa·s was obtained. The solution thus obtained was adjusted to a solution having a solid content of 10% by deionized water to obtain dispersant (a) to be used in suspension polymerization.

EXAMPLES

Example 1

To a reactor flask equipped with a stirrer, reflux condenser tube, temperature control device, dropping pump, and nitrogen introducing pipe, 45 parts of deionized water, and then 0.2 part of 28% ammonium water and 5 parts of an emulsified matter compounded at a proportion shown in Table 1 were introduced, and inside of the reactor was replaced by nitrogen while heated to 75° C., and an initiator solution obtained by dissolving 0.1 part of ammonium persulfate (polymerization initiator) into 5 parts of water was added to form seed particles. Measuring the temperature of the resultant solution in the reactor with a thermometer, an exothermic peak was confirmed, and then the remainder of the emulsified matter was dropped at an inside temperature of 75° C. over the period of 4 hours, and the resultant contents were further aged at 75° C. for 2 hours for carrying out emulsion polymerization to form emulsified dispersions. The emulsified dispersions thus obtained were cooled to room temperature, and spray dried at an inlet temperature of 170° C., outlet temperature of 60° C., and a revolution of atomizer of 25,000 rpm, using a spray dryer (L-8, manufactured by Ohkawara Kakohki Co., Ltd.) to recover a solid as the copolymer (A). Subsequently, a resin composition was prepared according to the proportion described in Table 1, and a test piece was manufactured in accordance with the aforementioned method to carry out the light stability test and the thermal stability test. The results are shown in Table 1.

Examples 2 to 4 and Comparative Examples 1 and 2

The same procedure as in Example 1 was carried out to carry out emulsion polymerization of each composition shown in Table 1, and a solid was recovered from the thus obtained emulsified dispersions by the same spray-drying method as in Example 1. The same procedure as in Example 1 was carried out to prepare a resin composition according to the proportion described in Table 1, then to form a test piece, and to carry out the light stability test and the thermal stability test. The results are shown in Table 1.

Example 5

To a reactor equipped with a stirrer and a thermometer, 145 parts by mass of deionized water, 0.5 part by mass of the dispersant (a), 0.1% by mass of sodium sulfate, and 0.1 part by mass of 28% ammonium water were introduced, and then a monomer mixture having the composition shown in Table 1 and 0.6 part by mass of lauroyl peroxide as a polymerization initiator were added. The contents were heated from 40 to 90° C. over the period of 1 hour and 25 minutes while stirred to make the temperature of the contents reach 90° C. After the temperature was reached 90° C., the contents were further stirred for 1 hour 30 minutes, and cooled to obtain a suspension liquid of polymer particles. The suspension liquid thus obtained was filtrated with a nylon filter having an aperture of 45 μm, and the residue was sufficiently washed with deionized water and then dried at 50° C. for 24 hours to obtain the copolymer (A). Subsequently, a resin composition was prepared according to the proportion described in Table 1, and a test piece was manufactured in accordance with the aforementioned method to carry out the light stability test and the thermal stability test. The results are shown in Table 1.

Examples 6 to 8 and Comparative Example 3

The same procedure as in Example 5 was carried out to carry out suspension polymerization of each composition shown in Table 1, and a solid was recovered from the thus obtained suspension liquid by the same method as in Example 5. The same procedure as in Example 5 was carried out to prepare a resin composition according to the proportion described in Table 1, then to form a test piece, and to carry out the light stability test and the thermal stability test. The results are shown in Table 1.

Example 9

The same procedure as in Example 1 was carried out to carry out emulsion polymerization of the composition shown in Table 1, and a solid was recovered from the thus obtained emulsified dispersions by the same spray-drying method as in Example 1. To the copolymer (A) thus recovered as a solid, "TINUVIN 123" (trade name, manufactured by Ciba Japan K.K.) was added as a hindered amine light stabilizer and the same procedure as in Example 1 was carried out to prepare a resin composition according to the proportion described in Table 1, then to form a test piece, and to carry out the light stability test and the thermal stability test. The results are shown in Table 1.

Example 10

The same procedure as in Example 1 was carried out to carry out suspension polymerization of the composition shown in Table 1, and a solid was recovered from the thus obtained suspension liquid by the same method as in Example 1. To the copolymer (A) thus recovered as a solid, "TINUVIN 770" (trade name, manufactured by Ciba Japan K.K.) was added as a hindered amine light stabilizer and the same procedure as in Example 1 was carried out to prepare a resin composition according to the proportion described in Table 1, then to form a test piece, and to carry out the light stability test and the thermal stability test. The results are shown in Table 1.

Comparative Example 4

A test piece was formed according to the proportion described in Table 1 using poly{[6-(1,1,3,3-tetramethylbutyl)amino-1,3,5-triazine-2,4-diyl][(2,2,6,6-tetramethyl-4-piperidyl)imino]hexamethylene(2,2,6,6-tetramethyl-4-piperidylimino)} as a stabilizer, and the light stability test and the thermal stability test were carried out. The results are shown in Table 1.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Monomer (a) | HALS 1 (part) | | | 50 | 20 | 30 | 30 | 30 |
| | HALS 2 (part) | 5 | 10 | | | | | |
| | Sub total | 5 | 10 | 50 | 20 | 30 | 30 | 30 |
| Monomer (b) | n-OA (part) | | | | | | 35 | |
| | i-BMA (part) | 95 | 90 | 50 | 30 | | | |
| | 2EHA (part) | | | | 30 | 35 | | |
| | St (part) | | | | | | | 35 |
| | t-BCHA (part) | | | | | 35 | 35 | 35 |
| | Sub total | 95 | 90 | 50 | 60 | 70 | 70 | 70 |
| Monomer (c) | MMA (part) | | | | 20 | | | |
| | n-BMA (part) | | | | | | | |
| | Sub total | 0 | 0 | 0 | 20 | 0 | 0 | 0 |
| Monomer | Total | 100 | 100 | 100 | 100 | 100 | 100 | 100 |
| nDM (part) | | 0 | 0.1 | 3 | 1 | 1.2 | 1.2 | 1 |
| Emulsifier 1 (part) | | 2 | 2 | 2 | 2 | 0 | 0 | 0 |
| Water (part) | | 100 | 100 | 100 | 100 | 0 | 0 | 0 |
| Polymerization method | | Emul. | Emul. | Emul. | Emul. | Suspen. | Suspen. | Suspen. |
| Mass average molecular weight (Mw) | | 168,000 | 121,000 | 20,000 | 35.000 | 35,000 | 35,000 | 38,000 |
| Light stabilizer | Copolymer (A) (%) | 5 | 5 | 1 | 2.5 | 2 | 2 | 2 |
| | HALS 3(%) oligomer | | | | | | | |
| | HALS 4 (%) 123 | | | | | | | |
| | HALS 5 (%) 770 | | | | | | | |

TABLE 1-continued

| Resin to which stabilizer is added | Polypropylene resin (%) | 95 | 95 | 99 | 97.5 | 98 | 98 | 98 |
|---|---|---|---|---|---|---|---|---|
| | HALS content (%) | 0.25 | 0.5 | 0.5 | 0.5 | 0.6 | 0.6 | 0.6 |
| Evaluation result | Thermal stability | 2 | 1 | 1 | 2 | 1 | 2 | 2 |
| | Light stability | 2 | 1 | 1 | 2 | 1 | 2 | 2 |

| | | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|---|
| Monomer (a) | HALS 1 (part) | 15 | 20 | 20 | 50 | 20 | 70 | |
| | HALS 2 (part) | 15 | | | | | | |
| | Sub total | 30 | 20 | 20 | 50 | 20 | 70 | |
| Monomer (b) | n-OA (part) | | | | | 30 | 20 | |
| | i-BMA (part) | | 30 | 30 | | | | |
| | 2EHA (part) | | 30 | 30 | | | | |
| | St (part) | | | | | | 10 | |
| | t-BCHA (part) | 70 | | | | | | |
| | Sub total | 70 | 60 | 60 | 0 | 30 | 30 | |
| Monomer (c) | MMA (part) | | 20 | 20 | | 50 | | |
| | n-BMA (part) | | | | 50 | | | |
| | Sub total | 0 | 20 | 20 | 50 | 50 | 0 | |
| Monomer | Total | 100 | 100 | 100 | 100 | 100 | 100 | |
| nDM (part) | | 1 | 1 | 1 | 3 | 1 | 5 | |
| Emulsifier 1 (part) | | 0 | 2 | 2 | 2 | 1 | 0 | |
| Water (part) | | 0 | 100 | 100 | 100 | 100 | 0 | |
| Polymerization method | | Suspen. | Emul. | Emul. | Emul. | Emul. | Suspen. | |
| Mass average molecular weight (Mw) | | 22,000 | 35,000 | 35,000 | 20,000 | 25,000 | 18,000 | |
| Light stabilizer | Copolymer (A) (%) | 2 | 2.5 | 2.5 | 1 | 2.5 | 1 | |
| | HALS 3(%) oligomer | | | | | | | 0.5 |
| | HALS 4 (%) 123 | | 0.1 | | | | | |
| | HALS 5 (%) 770 | | | 0.2 | | | | |
| Resin to which stabilizer is added | Polypropylene resin (%) | 98 | 97.4 | 97.3 | 99 | 97.5 | 99 | 99.5 |
| | HALS content (%) | 0.6 | 0.6 | 0.7 | 0.5 | 0.5 | 0.65 | 0.5 |
| Evaluation result | Thermal stability | 1 | 2 | 2 | 3 | 4 | 3 | 4 |
| | Light stability | 1 | 1 | 1 | 3 | 4 | 4 | 3 |

(Emul. means Emulsion; Suspen. means Suspension)
HALS1: 4-methacryloyloxy-1,2,2,6,6-pentamethylpiperidine
HALS2: 4-methacryloyloxy-2,2,6,6-tetramethylpiperidine
n-OA: Normal octyl acrylate
i-BMA: Iso-butyl methacrylate
2-EHA: 2-ethylhexyl acrylate
St: Styrene
t-BCHA: Tertiary-butylcyclohexyl acrylate
MMA: Methyl methacrylate
n-BMA: Normal butyl methacrylate
nDM: Normal dodecyl mercaptan
Emulsifier 1: "ADEKA REASOAP SR-10" (trade name, manufactured by ADEKA Corporation)
HALS3: Poly{[6-(1,1,3,3-tetramethylbutyl)amino-1,3,5-triazine-2,4-diyl][(2,2,6,6-tetramethyl-4-piperidyl)imino]hexamethylene(2,2,6,6-tetramethyl-4-piperidylimino)}
HALS4: "TINUVIN 123" (trade name, manufactured by Ciba Japan K.K.)
HALS5: "TINUVIN 770" (trade name, manufactured by Ciba Japan K.K.)

As can be understood from Table 1, the stabilizer of the present invention shows excellent competence for improving light stability and thermal stability. On the other hand, the stabilizers in Comparative Examples 1 to 3 have compositions of the monomers (a) to (c) which are out of the range of the present invention and thus sufficient light stability and thermal stability cannot be obtained. In Comparative Example 4, a high molecular weight stabilizer is used, however, its dispersibility is inadequate, so that either thermal resistance or light resistance or both cannot be improved sufficiently. Consequently, it is understood that the stabilizer of the present invention is extremely useful as a stabilizer for the PP resin.

INDUSTRIAL APPLICABILITY

By adding the stabilizer of the present invention to a PP resin for uses such as automotive interior and exterior materials, building exterior materials, exterior members, electric wire coating materials, sporting goods, textiles, medical supplies, food containers, parts for household electrical appliances, OA equipment, household articles, furniture, and various films, a high degree of stability can be given to the PP resin, and hence the stabilizer of the present invention is extremely useful in industry.

What is claimed is:

1. A stabilizer for a polyolefin resin, comprising a copolymer (A) which is obtained by polymerizing an unsaturated monomer mixture comprising
   1 to 50 parts by mass of at least one ethylenically unsaturated monomer (a) represented by the following general formula (I) and having a piperidyl group in a molecule,
   50 to 99 parts by mass of at least one monomer (b) selected from the group consisting of isobutyl methacrylate and an alkyl (meth)acrylate having an alkyl group with 6 to 13 carbon atoms, and 0 to 15 parts by mass of at least one ethylenically unsaturated monomer (c) other than the monomers (a) and (b), with the proviso that the total of the monomers (a), (b), and (c) is 100 parts by mass and monomer (b) comprises at least 50 parts by mass of at least one monomer selected from the group consisting of isobutyl methacrylate, 2-ethylhexyl acrylate and p-tertiary-butylcyclohexyl acrylate:

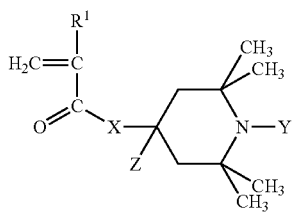

(I)

wherein $R^1$ represents a hydrogen atom or an alkyl group having 1 to 2 carbon atoms, X represents an oxygen atom or an imino group, Y represents a hydrogen atom or an alkyl or alkoxyl group each having 1 to 20 carbon atoms, and Z represents a hydrogen atom or a cyano group.

2. A stabilizer for a polyolefin resin, comprising a copolymer (A) which is obtained by polymerizing an unsaturated monomer mixture comprising 6 to 50 parts by mass of at least one ethylenically unsaturated monomer (a) represented by the following general formula (I) and having a piperidyl group in a molecule, 50 to 94 parts by mass of at least one monomer (b) selected from the group consisting of isobutyl methacrylate and an alkyl (meth)acrylate having an alkyl group with 6 to 13 carbon atoms, and 0 to 15 parts by mass of at least one ethylenically unsaturated monomer (c) other than the monomers (a) and (b), with the proviso that the total of the monomers (a), (b), and (c) is 100 parts by mass and monomer (b) comprises at least 50 parts by mass of at least one monomer selected from the group consisting of isobutyl methacrylate, 2-ethylhexyl acrylate and p-tertiary-butylcyclohexyl acrylate:

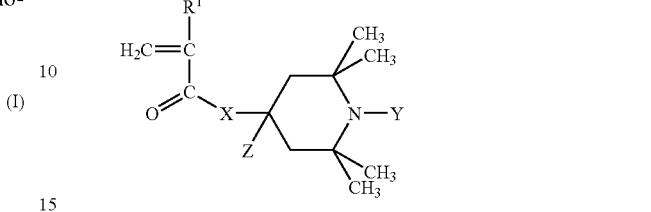

(I)

wherein $R^1$ represents a hydrogen atom or an alkyl group having 1 to 2 carbon atoms, X represents an oxygen atom or an imino group, Y represents a hydrogen atom or an alkyl or alkoxyl group each having 1 to 20 carbon atoms, and Z represents a hydrogen atom or a cyano group.

3. The stabilizer for a polyolefin resin according to claim 1, wherein the at least one monomer (b) is isobutyl methacrylate.

4. A polypropylene resin composition comprising the stabilizer for a polyolefin resin according to any one of claims 1 to 3.

5. A polypropylene resin composition comprising the stabilizer for a polyolefin resin according to any one of claims 1 to 3 and a hindered amine light stabilizer other than the stabilizer.

6. The stabilizer for a polyolefin resin according to claim 1, wherein the unsaturated monomer mixture comprises 10 to 40 parts by mass of the at least one ethylenically unsaturated monomer (a).

7. The stabilizer for a polyolefin resin according to claim 1, wherein the unsaturated monomer mixture comprises two or more of the ethylenically unsaturated monomer (c).

* * * * *